United States Patent [19]
Healey

[11] Patent Number: 5,806,796
[45] Date of Patent: Sep. 15, 1998

[54] COMPOSITE LAMINATE

[75] Inventor: Michael J. Healey, Bristol, Great Britain

[73] Assignee: British Aerospace Public Limited Company, Hampshire, United Kingdom

[21] Appl. No.: 610,230

[22] Filed: Mar. 4, 1996

[30] Foreign Application Priority Data

Mar. 4, 1995 [GB] United Kingdom ............ 9504372

[51] Int. Cl.⁶ .................................................. B64C 1/12
[52] U.S. Cl. .................. 244/117 R; 428/911; 244/121
[58] Field of Search ................. 244/117 A, 117 R, 244/133, 119, 121; 428/911, 212, 113, 240, 323, 902; 89/36.02, 36.11, 36.12

[56] References Cited

U.S. PATENT DOCUMENTS

| | | | |
|---|---|---|---|
| 2,941,759 | 6/1960 | Rice et al. | 244/117 A |
| 4,061,815 | 12/1977 | Poole, Jr. | |
| 4,428,998 | 1/1984 | Hawkinson | 244/121 |
| 4,732,803 | 3/1988 | Smith, Jr. | 244/121 |
| 4,879,165 | 11/1989 | Smith | 244/121 |
| 5,245,180 | 9/1993 | Sirkis. | |
| 5,271,879 | 12/1993 | Saatchi et al. | 244/133 |
| 5,330,124 | 7/1994 | Le Touche | 244/117 A |

FOREIGN PATENT DOCUMENTS

| | | |
|---|---|---|
| 0 057 270 | 8/1982 | European Pat. Off. . |
| 0 296 067 | 12/1988 | European Pat. Off. . |
| 0 313 171 A1 | 4/1989 | European Pat. Off. . |
| 0 496 550 A1 | 7/1992 | European Pat. Off. . |
| 2 614 579 | 4/1988 | France . |
| 38 36 442 A1 | 5/1990 | Germany . |
| 94/25180 | 11/1994 | WIPO . |

*Primary Examiner*—Galen L. Barefoot
*Attorney, Agent, or Firm*—Nixon & Vanderhye P.C.

[57] ABSTRACT

A composite laminate, an aircraft skin panel, an airfoil, an aircraft and a method of manufacturing such a composite laminate are provided. The laminate includes at least three layers, namely a first layer of fiber reinforced composite material, a second layer usually metallic and usually forming a surface of the component and a third layer of impact energy-absorbing material interposed between the first and second layers, wherein the second and third layers protect the first layer from impact damage. The method of manufacture involves placing all three layers, including a said third layer of foaming adhesive, in a closed mould and foaming the adhesive to form a component to shape.

20 Claims, 4 Drawing Sheets

COMPOSITE LAMINATE

BACKGROUND TO THE INVENTION

This invention relates to composite laminates and in particular to such laminates comprising fibre reinforced plastics composite structural material having one or more layers of non-structural material attached thereto, generally used for protective purposes.

DESCRIPTION OF THE PRIOR ART

In many industries, including the aerospace industry fibre reinforced plastics composite materials are widely used owing to their high strength/stiffness to weight ratio. The nature of such composites renders them vulnerable in certain respects however.

Firstly, fibre reinforced plastics composite materials can be brittle in certain high strength constructions. For example carbon fibre composites are generally brittle and therefore prone to extensive impact damage despite having great strength/stiffness to weight capability. It is known to apply a protective layer of a composite material using different fibre reinforcement, for example one of the aramid fibres which are more damage tolerant than carbon fibres. Secondly, detection of impact damage to fibre reinforced plastics composite structures can be a dangerous and intractable problem. This is because the site of impact of an object striking the surface of the composite material can reveal little or nothing of the extent of the damage caused to sub-layers of the structure. A typical damage configuration to such a composite structure having several layers would reveal perhaps no more than a minor blemish on the surface which received the impact. However the layers of material underneath could reveal progressively increasing damage away from the surface where the impact occurred. Hence extremely serious structural damage can take place to such composite materials whilst being virtually undetectable on the surface. For components where strength/stiffness to weight ratio is critical, for example aircraft wings, such undetected damage could be catastrophic.

Known reinforcements as described above using differing reinforcing fibres on the surface of the structural material can to some extent alleviate the problem of sub-surface damage but the danger still remains that undetected severe damage from heavy impacts can occur and remain undetected.

An additional problem with such fibre reinforced composite materials is that damage when it occurs can be extremely time consuming and expensive to repair. In addition considerable weight must often be added to the structure to ensure an adequate repair.

It is an object of the invention to provide an improved composite laminate.

SUMMARY OF THE INVENTION

According to one aspect of the present invention there is provided a composite laminate including a first layer of fibre reinforced composite material, a second layer forming a protective skin and a third layer of impact energy-absorbing material interposed between the first and second layers.

Use of such a composite laminate with the second layer forming an outer surface of a component therefore will provide protection to the first layer of fibre reinforced composite material. Such protection would primarily be against impact damage to the laminate. Secondary protection might be against the elements. A lighter structure can be expected to result, for high strength/stiffness applications, where impact damage must be protected against. This is because the first layer of fibre reinforced composite material will no longer have to provide for resistance to impact to such an extent, or at all. This layer can therefore be decreased in thickness. An example of the application of this theory is set out below.

Compression strength after impact "CAI" is typically reduced by about 35% at barely visible impact damage "BVID" relative to an unimpacted specimen. For example a 10 mm thick structure after a BVID impact would typically be able to carry the same compressive load as an unimpacted 6.5 mm thick specimen. Hence if any impact damage to the first layer of fibre reinforced composite material of the invention can be prevented by a coating of the second and third layers of 3–5 mm in thickness but of equivalent mass to say 1 mm of fibre reinforced composite material then theoretically the weight and cost of 2.5 mm of fibre reinforced composite material could be saved if CAI was the major design consideration.

According to a second aspect of the invention there is provided a vehicle skin panel comprising a composite laminate according to the first aspect of the invention.

The vehicle may advantageously be an aircraft and the skin panel may be used for any part of the surface skin of the aircraft, for example the wings, fin, tailplane, fuselage or any fairing panel. Many flight control surfaces of aircraft are now made of composite materials and the composite laminate of the invention lends itself particularly well to such applications, in particular because the potential for thickness reduction of the first layer of fibre reinforced composite material brings potential advantages of reduced component cost and weight, the latter leading to potential payload increases.

Panels of the composite laminate may be attached together or attached to other adjoining structure using fasteners such as bolts or by using adhesives. For applications where integrity of aerodynamic flow is paramount it may be desirable to firmly attach the first layer of fibre reinforced composite material to adjoining structure and then to form the second and third layers onto the first layer in situ. Surface irregularities in the second layer can thus be avoided.

According to third and fourth aspects of the invention there are provided respectively an airfoil and an aircraft fuselage at least part of the skins of which are comprised of a composite laminate according to the first aspect of the invention.

The second layer may suitably be metallic, for example, of aluminium or titanium and may be a foil of an appropriate thickness. By "foil" is meant metal generally of thickness between 0.01–1.00 mm and often falling in the range 0.05–0.30 mm. Such foils may suitably be used in aircraft wing construction.

The use of aluminium foil for the second layer conveniently can afford lightning strike protection to a laminate of the invention, when used for aircraft skin construction for example.

The second layer, at least when metal, although providing its own protection against the elements may be safely painted or otherwise covered if desired and chemical paint stripper has the possibility to be used in the process of repainting where necessary. This is not possible with known fibre reinforced plastics materials under certain safety regulations, for example in the aircraft industry.

Alternative material comprised in the second layer may include meshes of metallic wire or fibres, for example copper, aluminium or nickel. The fibres may, alternatively be metal coated fibres of for example glass. The use of metals in this way again affords the possibility of lightning strike protection for the laminate.

Such meshes may be laid upon or embedded in thermoplastic or thermoset composite materials or other adhesive materials whereby the second layer is formed by such a mesh and/or a said thermoplastic, thermoset composite or adhesive material.

Where a mesh is employed in or for the second layer or where the second layer includes an environmentally susceptible material, a barrier layer may be added to provide environmental protection. A known barrier layer material used in the aerospace industry is Tedlar (registered trade mark to the DuPont Company), a poly vinylidene fluoride.

Depending upon the thickness of the second layer additional impact resistance and plastic deformation without breakthrough of an impacted object may be enabled thereby. The plastic deformation properties of aluminium foil render this metal particularly useful for minimising impact damage to the first structural layer. In addition the second layer may act as a thermal barrier, for example when used for an aircraft skin panel, against heat from short bursts at supersonic speeds of the aircraft or against fire or hot air duct fracture. It may also act as an ablative barrier, for example against rain, dust, fire and the like. For resistance against fire or ablation, foams based wholly or partly on phenolic resin are desirable.

It will be appreciated that damage detection will be very considerably enhanced with the use of a relatively thin second layer as impacts will leave a clearly visible mark.

The third layer of impact energy-absorbing material is designed to absorb impact energy by gradual crushing and thus protect the underlying first layer. When the composite laminate of the invention is used as a structural member of a vehicle, for example, impact protection may be afforded against such accidental damage as tools being dropped or stones or other objects striking the laminate when the vehicle is in motion.

The third layer of impact energy absorbing material is desirably a relatively low density material, for example of relative density less than substantially 0.9, typically 0.2–0.7, and may be a preformed material or may comprise an in-situ foaming material, or indeed may comprise a micro-balloon filled resin. Other energy absorbing materials than those described are envisaged as falling within the scope of the invention.

Examples of known commercial foaming adhesives which may be found suitable for use with the present invention are as follows.

Ciba-Geigy Redux 219 Foaming Film Adhesive. This adhesive has a relative density at 70% expansion of 0.86 and at 150% expansion of 0.59. It may be cured at temperatures between 150 and 180 degrees C.

Ciba-Geigy Redux 204 Foaming Paste Adhesive. This has a relative density at 50% expansion of 0.71; at 100% expansion of 0.50 and at 200% expansion 0.32. It may be cured at temperatures between 100 and 180 degrees C.

Cyanamid FM27 Foaming Film Adhesive. This has a relative density when cured of between 0.19 and 0.26 and may be cured at temperatures between 120 and 180 degrees C.

Cyanamid FM410-1 Foaming Film Adhesive. This has a relative density when cured between 0.32 and 0.64 and may be cured at temperatures between 120 and 180 degrees C.

In order to increase energy dissipation within the third layer of impact energy absorbing material, reinforcing fibres may be dispersed therein. These are likely to be dispersed in a relatively low density as compared with the first layer and may be dispersed in a random fashion throughout a matrix of the impact energy absorbing material or may be present in more distinct layers, typically as a mat or woven, for example as a fabric and possibly predominantly positioned nearer to the second layer than the first layer. The role of the fibres may also be at least in part to maintain structural integrity of the foam. The fibres may be aramid, glass or high modulus polyethylene fibres, for example those produced under the name Dyneema. It will be appreciated that positioning of a said distinct layer or layers of fibres within the third layer of impact energy absorbing material will be a matter of design choice. Positioning of such a distinct layer nearer to the second layer will assist in maximising impact energy dissipation within the second and third layers in order to avoid damage occurring to the first layer.

The selection of thickness, mechanical strength and deformation parameters for the second and third layers will depend upon particular requirements, for example the degree of damage protection required or the flexibility required or upon whether a walk-on surface is required or aerodynamic loading. The overall thickness of the second and third layers may typically be between two and ten mm, for example in the region of 3 mm for a laminate forming an aircraft skin panel, but may be more or less.

The composite laminate may include a layer of damage sensor fibres, for example optical fibres which may be positioned within the third layer adjacent the first layer and possibly attached thereto or exceptionally embedded in the surface of the layer of fibre reinforced composite material to act as damage sensors in the event of an impact occurring greater than the second and third layers were designed to protect.

The optical fibres may be tacked on to the layer of fibre reinforced composite material and/or an overlay or a film, typically an adhesive, may be placed over them for protection and/or to prevent displacement by expanding foam of the second layer.

The composite laminate of the invention may be modified for different applications. For example, a fluid passage defined through the third layer may be provided for purposes of enhancing laminar airflow over a wing skin manufactured of such a composite laminate. In addition anti-icing or de-icing may be achieved with such a fluid passage.

The fluid passage through the third layer may be achieved by the use of an open cell foam to define the passage, by a preformed pipework set within the third layer or by the foam or other suitable impact energy-absorbing material being placed in blocks or strips in order to create channels. The second layer may be perforated to place the at least one fluid passage in the third layer in communication with the exterior of the laminate. Drilling of the second layer and/or the third layer, for example using lasers, may be required for the perforation for laminar flow applications.

Where such laminar flow control or anti-icing is being provided using open cell foam for the third layer, the latter may include an impermeable intermediate barrier, eg aluminium foil between the open cell passage and a sub-layer of the third layer adjacent the first layer and not intended to provide such fluid passage.

Manufacture of the first layer of fibre reinforced composite material may be by traditional moulding methods whilst desirably providing a roughened exterior surface thereto for improved bonding to the third layer.

According to a fifth embodiment of the invention there is provided a method of manufacturing a composite laminate including a first layer of fibre reinforced composite material, a second layer forming a protective skin and a third layer of impact energy-absorbing material interposed between the first and second layers, the method including the steps of:

providing a pre-cured first said layer of fibre reinforced composite material placing foaming material as required, on the first layer, placing the second layer on the foaming material to form a moulding assembly placing the moulding assembly in a mould of the required form, and foaming the said material whereby the expanding foam causes the second and third layers to form to the shape of the mould whereby to create a composite laminate of the required form.

The surface for attachment to the third layer may include altered contours where appropriate to accommodate the thickness of the second and third layers. It will be appreciated that despite the added thickness of the second and third layers the overall thickness of the composite laminate may be little thicker, if any, than a sheet of composite material of traditional construction. This is owing to the possibility of reducing the thickness of the first layer which no longer has to accommodate impacts, in the manner of the prior art, with sufficient margin of strength to perform to specification when damaged.

Optical fibre sensors, if fitted, would be placed on the pre-cured layer of fibre reinforced composite material with appropriate pickups provided for signal processing. Foaming material, reinforcing fibres if used and the second layer may then be placed on top.

When certain materials are used for the second and third layers, for example high modulus polyethylene reinforcing fibres within the third layer, temperatures employed during forming the laminate to the shape of the mould which exceed substantially 100° C. and with some materials not exceeding 80° C. may be destructive. Materials which foam at temperatures not exceeding substantially 100° C. and with some materials, not exceeding 80° C., may therefore be employed in these circumstances. Foamed materials so formed may have open or closed cell formations. Vacuum forming may suitably be employed to achieve foaming at reduced temperatures, where necessary.

BRIEF DESCRIPTION OF THE DRAWINGS

The invention will now be described by way of example with reference to the accompanying drawings of which.

DESCRIPTION OF THE PREFERRED EMBODIMENT

Figure 1:
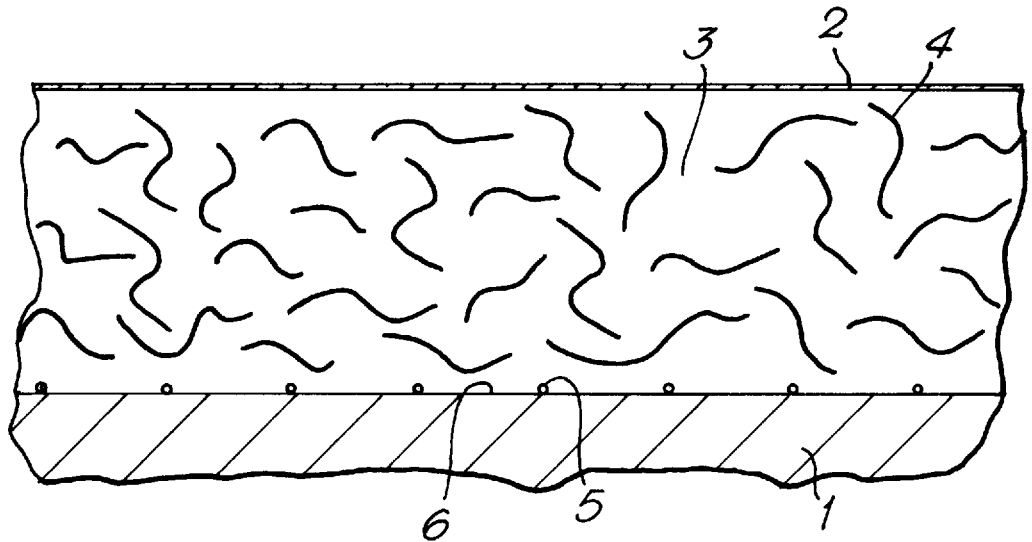
FIG. 1 is a section through a composite laminate according to one aspect of the invention.

Referring to the drawings, FIG. 1 shows a composite laminate according to the invention in section comprising a first layer 1 of fibre reinforced composite material, a second barrier layer 2 of aluminium foil and a third layer 3 of low density foamed material interposed between the first and second layers 1, 2. Randomly distributed within the third layer 3 are energy dissipating fibres 4 of aramid material. Damage sensors in the form of optical fibres 5 lay across a top surface 6 of the first layer 1. These optical fibres 5 are connected to signal processing equipment (not shown) adapted to register a discontinuity in any one of the optical fibres 5 which may be indicative of a crack or other damage to the first layer 1.

Figure 2:
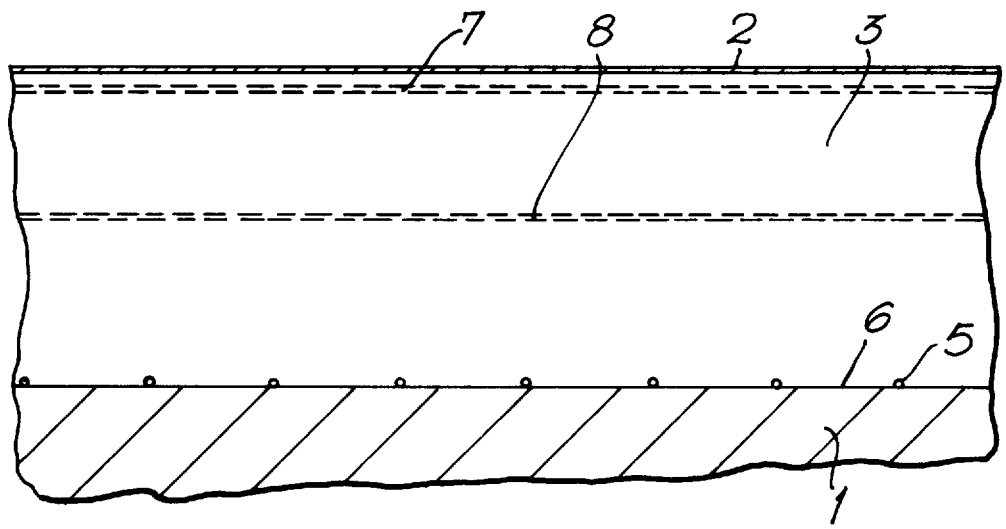
FIG. 2 is a section through a composite laminate according to a second aspect of the invention.

Referring to FIG. 2, an alternative composite laminate according to the invention is shown in section.

This comprises a first layer 1, a second layer of aluminium foil 2 of a thickness 0.1 mm, a third layer of low density foamed material 3 and two layers 7, 8 of woven aramid fibres each of thickness 0.2 mm. The total thickness of the second and third layers is 5 mm. In addition a layer of optical fibres 5 is similarly distributed over the top surface 6 of the first layer 1. The layer 7 of woven aramid fibres is positioned very close to the aluminium foil 2 and the foil and fibres are designed to maximise the area over which energy from an impact is dissipated within the third layer by gradual crushing. The further layer 8 of fibres has been included for added impact resistance but may be left out in circumstances where lower impact protection is required.

Figure 3:
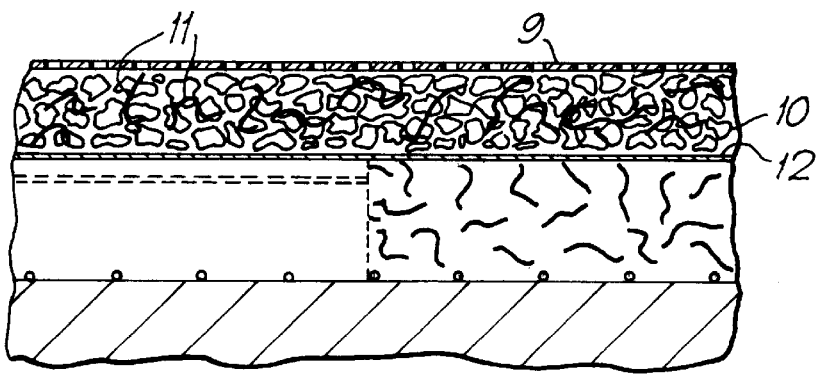
FIG. 3 is a section through a composite laminate wing skin panel according to a third aspect of the invention.

FIG. 3 is an alternative section showing a composite laminate according to the invention in the form of an aircraft wing skin panel having provision for drawing off the boundary layer of air over an aerodynamic surface formed by a perforated aluminium layer 9. The aluminium layer 9 has been perforated by laser drilling to form a series of regularly spaced fine holes through the material. Immediately under the aluminium layer 9 is an open cell foam 10 forming part of the third layer according to the invention. The open cell foam 10 is interspersed with randomly positioned reinforcing fibres 11. Underneath the open cell foam 10 is a second intermediate aluminium layer 12 forming an impermeable barrier to air or moisture. Under the second aluminium layer 12 is a structure substantially according to that shown in FIG. 1 on the right or FIG. 2 on the left save for the omission of the layer 8 of fibres in FIG. 2.

In effect therefore it will be seen that the structure shown in FIG. 3 substantially corresponds to that shown in FIGS. 1 or 2 but with the addition of a layer of open cell foam and a top layer of perforated aluminium foil to provide a surface structure suitable for drawing off or "retaining" a boundary layer of air moving over the surface of the aluminium layer 9 or for purposes of passing hot air therethrough for anti-icing of the aluminium layer 9. It will be appreciated that pumping means will be required in either case above, to provide suction in the case of a boundary layer retention and to provide positive pressure in the case of de-icing or anti-icing. These pumping means may be of any well known type suitable for the purpose.

Figure 4:
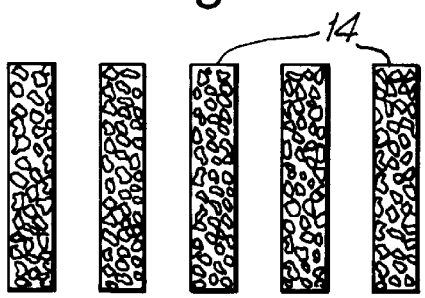
FIG. 4 is a plan view of ducting within the second layer.
Figure 5:
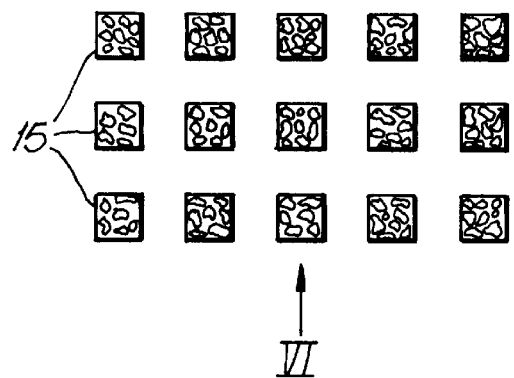
FIG. 5 is a plan view of alternative ducting within the second layer.
Figure 6:
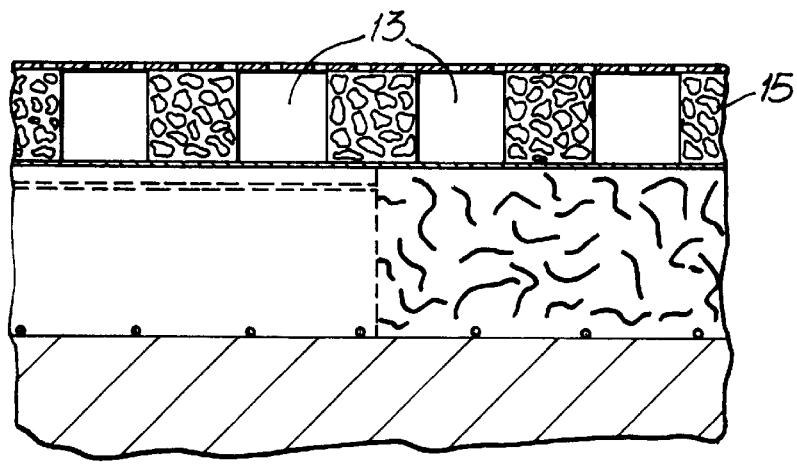
FIG. 6 is a view on the arrow VI of FIG. 5.

FIGS. 4, 5 and 6 show use of alternative methods of providing boundary layer retention or anti-icing for an aircraft wing. FIGS. 4 and 5 show in plan, alternative arrangements for blocks of foamed material forming all or part of a third layer of a composite laminate according to the invention. The foam is arranged in strips 14 in FIG. 4 and in blocks 15 in FIG. 5. The arrangement of FIG. 4 provides for movement of air in one direction along a wing of an aircraft. This direction is normally spanwise. The arrangement of FIG. 5 allows for air movement both spanwise and chordwise in the same circumstances.

Figure 8:
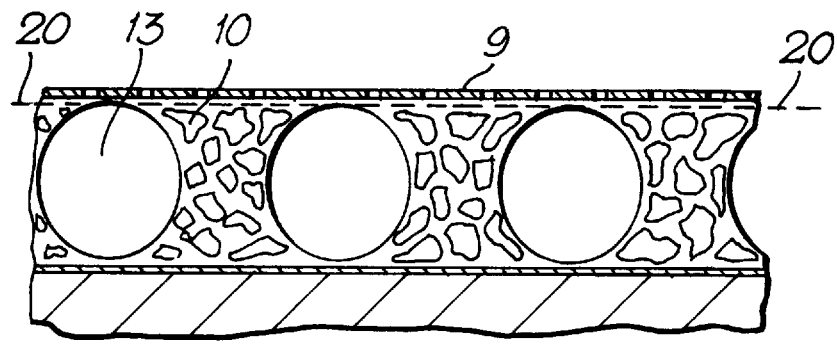
FIG. 8 shows an alternative embodiment to that of FIG. 6.

FIG. 6 shows a section through a composite laminate of the invention incorporating the arrangement of either FIG. 4 or FIG. 5 when viewed in the direction of arrow VI. It can be seen here that a series of ducts 13 are provided between adjacent strips 14 or blocks 15 of foamed material. The ducts are shown as parallel sided although differing duct designs may be required according to different suction requirements, for example as shown in FIG. 8. FIG. 8 also shows a layer of fabric 20 immediately beneath the aluminium layer 9. This fabric 20 provides reinforcement for panels subject to being walked on etc. A combination of the ducts 13 and the porous foam 10 of the example of FIG. 8 may be used to obtain required suction for a hybrid laminar flow panel.

Figure 9:
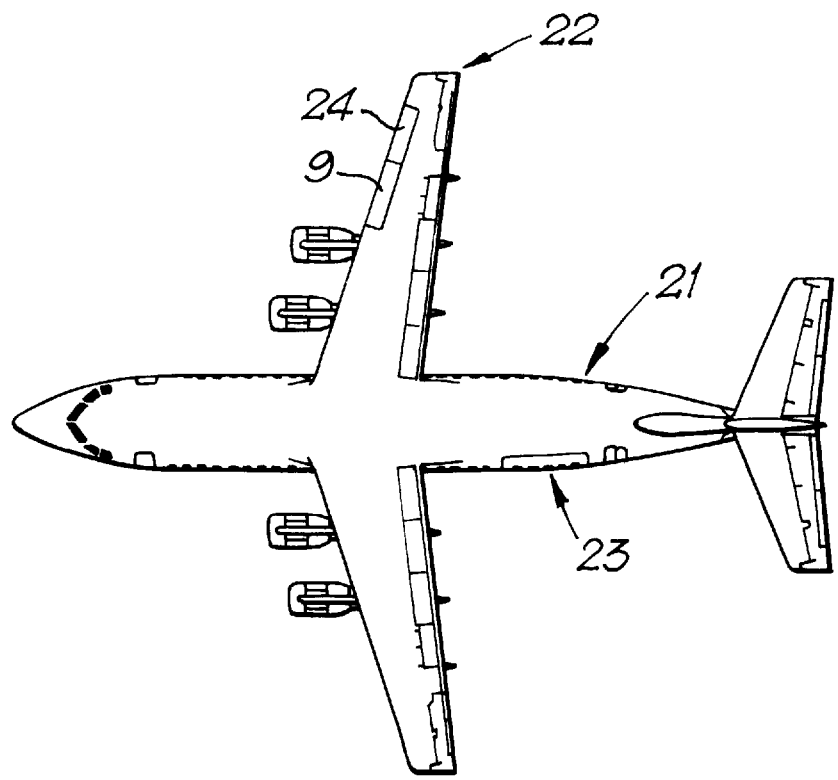
FIG. 9 shows in plan an aircraft having a fuselage, skin panels and airfoils, according to the invention.

FIG. 9 shows an aircraft 21 according to the invention. The aircraft has an airfoil in the form of a wing 22 according to the invention and a fuselage 23 according to the invention. At a leading edge 24 of the wing are fixed composite laminates having a perforated second layer with a fluid passage in the third layer for effecting hybrid laminar flow of air over the wing.

The advantages foreseen for a composite laminate used according to the invention are as follows:

i) A thinner first layer of fibre reinforced composite material may be required for a given residual design strength, after impact owing to the protective effect of the second and third layers on the first layer. Savings in overall mass of the laminate may therefore result which may similarly result in a cheaper laminate overall owing to the reduction in the generally more expensive layer of fibre reinforced composite material.

ii) Substantially easier detection of impact sites from indentations in the second and third layers.

iii) Relatively easy non structural repairs to the second and/or third layers for minor damage.

iv) A reduction or elimination of difficult structural repairs to the underlying first layer.

v) Where a metallic second layer is used, reduced lightning strike damage to the first fibre reinforced composite layer owing to the metallic layer being held off the first layer.

vi) Simpler and potentially cheaper provision for damage detection to the first layer by the placing of optical fibres on the first layer rather than in it. This is likely to lead to reduced processing problems and the elimination of resin rich areas within the first layer around the thicker optical fibres. In the prior art these areas are associated with optical fibres embedded in such a fibre reinforced composite material.

vii) Moisture ingress associated with damage in the third layer would be susceptible to mapping using thermography.

viii) Where the third layer is a foamed material, damping of panel resonance in the laminate may be expected to result.

ix) The second layer of the laminate can be painted, when metallic, and regulations in certain industries like the aircraft industry preventing the use of chemical paint strippers owing to the risk of matrix degradation may not apply. The prevention of use of paint strippers leads in many cases to excessive build up of paint on the surface which in turn leads to risk of cracking of the paint and can also cause an unacceptable weight increase to the structure.

x) The second layer o f the laminate, on its own or in combination with the third layer, may provide a thermal, fire and/or ablation barrier.

xi) The laminate of the invention may be used to supply structural and/or acoustic damping owing at least in part to the damping properties of the third impact energy absorbing layer.

Figure 7A:
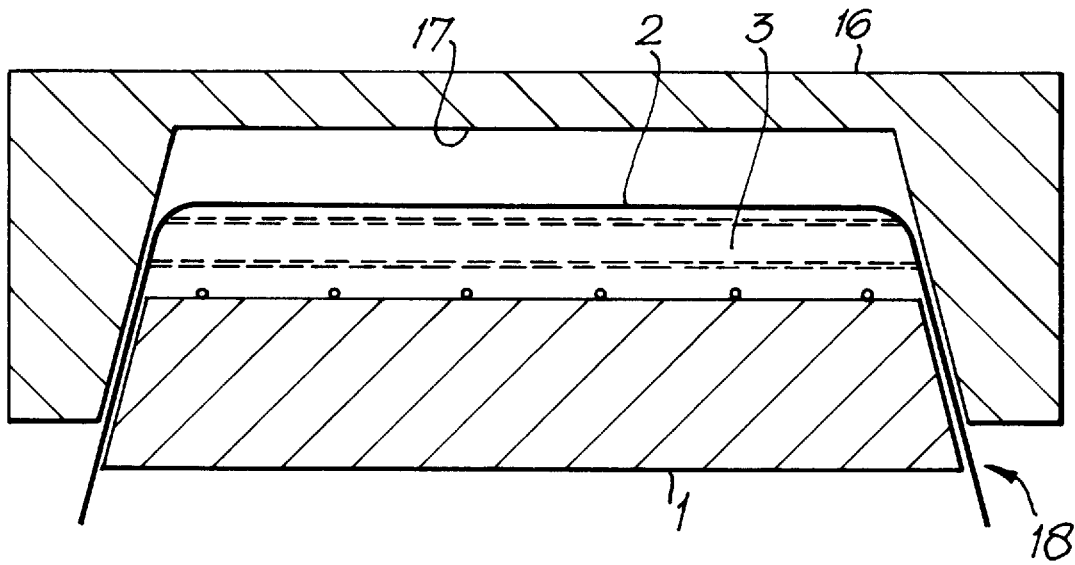
FIG. 7A is a section through a mould tool and moulding assembly for forming according to the invention.
Figure 7B:
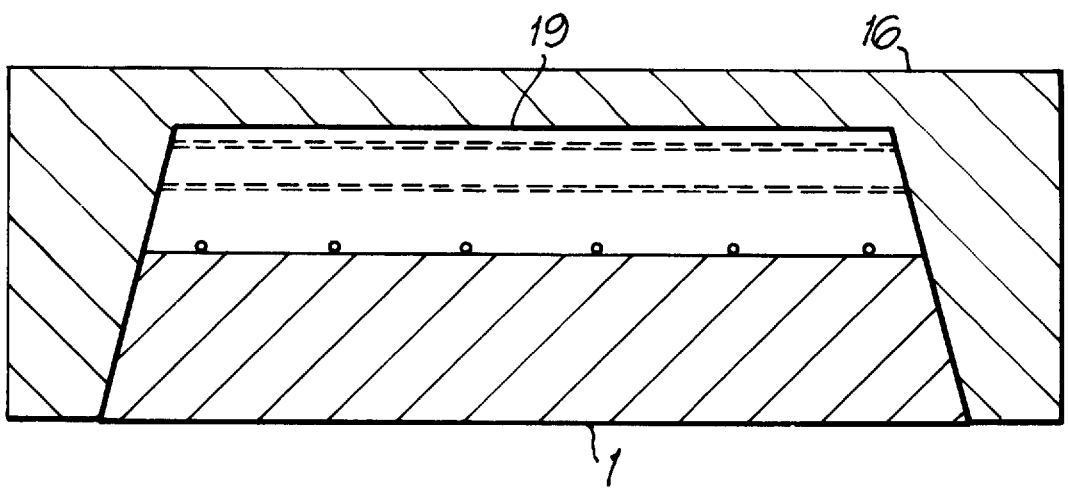
FIG. 7B shows the components of FIG. 7A assembled for moulding to take place.

Referring to FIGS. 7A and 7B, a mould tool 16 is shown having a tool surface 17. A moulding assembly 18 comprises a first layer of fibre reinforced composite material 1, a second layer of aluminium foil 2, a third layer of foamable adhesive 3, a layer of woven aramid fibre matting 7 and a further layer of woven aramid fibre matting 8 acting as reinforcing layers within the foam. Placed on a top surface 6 of the first layer 1 are optical fibres 5 for indicating damage.

The third layer of foamable adhesive 3 is as yet uncured.

In FIG. 7B the moulding assembly 18 has been placed against the tool surface 17 and the temperature within the mould tool has been raised to a temperature at which the foamable material 3 will cure. It will be seen that the aluminium foil has now formed to the shape of the tool surface 17. Foaming of the foamable material now takes place during curing thereof which forces the aluminium foil into intimate contact with the tool surface whereby the desired form and surface finish of an outer surface 19 of the finished component is achieved.

The advantages foreseen for the method of the invention are as follows:

1. Restrictions to thickness of the second and/or third layers which apply to a single stage moulding process will not apply to the method of the invention.

2. Damage sensors, eg fibre optic damage sensors, may be easily attached to an outer surface of the fibre reinforced composite material before the addition of the third layer thereto. Because the outer surface of the fibre reinforced composite material is no longer acting as the outer surface of the laminate, the addition of damage sensors will not affect the surface finish of the overall laminate.

3. Because the second and third layers can be formed on the first layer at temperatures as low as 100 degrees Centigrade, or even lower with resin development for the foaming material, the fibre reinforced composite material will not be affected by the moulding process for the second and third layers. In addition, relatively cheap mould materials may be used for moulding the second and third layers, such as plywood.

4. Because of the addition of the second and third layers to the fibre reinforced composite material, it will no longer be necessary to grind to tolerance filament wound structures of the composite material when used for this purpose. In addition, the more expensive mould tools for forming the fibre reinforced composite material at a higher temperature need no longer be manufactured to such close tolerances, and dimensional control of the aerodynamic surface is rendered easier for the laminate at the lower forming temperatures for the second and third layers.

5. The method of the invention is suitable for manufacture of the fibre reinforced composite material by resin transfer moulding, filament winding or similar.

6. For large structures where high forming pressures can be required for the first layer, these are obviated for the steps of forming the second and third layers of the laminate.

I claim:

1. A composite laminate including:
   a first layer of fibre reinforced composite material, said first layer providing primary structural strength for said composite laminate;
   a second layer forming a protective skin and having a property of plastic deformation under a substantial impact; and
   a third layer of impact energy-absorbing material interposed between the first and second layers and having a property of energy absorption when deformed, said second and third layers not providing primary structural strength for said composite laminate, said second and third layers in combination providing both a visible indication of a substantial impact sufficient to deform said second layer of said composite material and protection to said first layer by energy absorption of said substantial impact in said third layer.

2. A composite laminate as in claim 1 in which the second layer is metallic.

3. A composite laminate as in claim 1 in which the second layer is of aluminium foil.

4. A composite laminate as in claim 1 in which the third layer comprises an in-situ foaming adhesive.

5. A composite laminate as in claim 1 in which the third layer comprises a micro-balloon filled resin.

6. A composite laminate as in claim 1 in which the third layer comprises a pre-foamed material.

7. A composite laminate as in claim 1 in which the third layer includes reinforcing fibres dispersed therein.

8. A composite laminate as in claim 7 in which the reinforcing fibres are woven together.

9. A composite laminate as in claim 7 in which the reinforcing fibres are predominantly positioned nearer to the second layer than the first layer.

10. A composite laminate as in claim 1 including a layer of damage sensor fibres positioned within the third layer adjacent the first layer.

11. A composite laminate as in claim 2 including at least one fluid passage defined through the third layer.

12. A composite laminate as in claim 11 in which the metallic layer is perforated to place the at least one fluid passage in the third layer in communication with the exterior of the laminate.

13. A composite laminate as in claim 12 in which the at least one fluid passage is defined through open cell foam of the third layer.

14. A composite laminate as in claim 13 in which the at least one fluid passage defined through the open cell foam is partly bounded by an impermeable layer placed at an intermediate position within the third layer.

15. A composite laminate as in claim 11 in which the at least one fluid passage is defined by channels formed between adjacent strips of adhesive of the third layer.

16. An aircraft skin panel comprising a composite laminate including:
    a first layer of fibre reinforced composite material, said first layer providing primary structural strength for said composite laminate;
    a metallic second layer and having a property of plastic deformation under a substantial impact; and
    a third layer of impact energy-absorbing material interposed between the first and second layers and having a property of energy absorption when deformed, said second and third layers not providing primary structural strength for said composite laminate, said second and third layers in combination providing both a visible indication of a substantial impact sufficient to deform said second layer of said composite material and protection to said first layer by energy absorption of said substantial impact in said third layer.

17. An airfoil including at least one aircraft skin panel according to claim 16.

18. An aircraft fuselage including at least one skin panel according to claim 16.

19. An aircraft including at least one aircraft skin panel according to claim 16.

20. A method of manufacturing a composite laminate including a first layer of fibre reinforced composite material, a metallic second layer and a third layer of impact energy-absorbing material interposed between the first and second layers, the method including the steps of:
    providing said pre-cured first layer of fibre reinforced composite material;
    placing foaming adhesive on the first layer;
    placing the second layer on the foaming adhesive to form a moulding assembly;
    placing the moulding assembly in a mould of the required form, and
    foaming the foaming adhesive where the expanding foam causes the second and third layers to form to the shape of the mould creating a composite laminate of the required form.

* * * * *